F. S. EWING.
SCALE.
APPLICATION FILED MAR. 24, 1919.
1,332,116.
Patented Feb. 24, 1920.
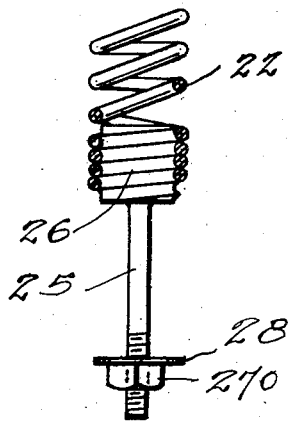
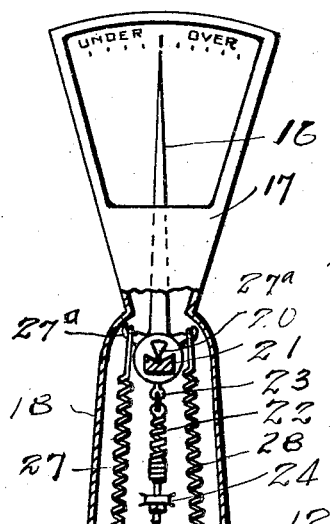
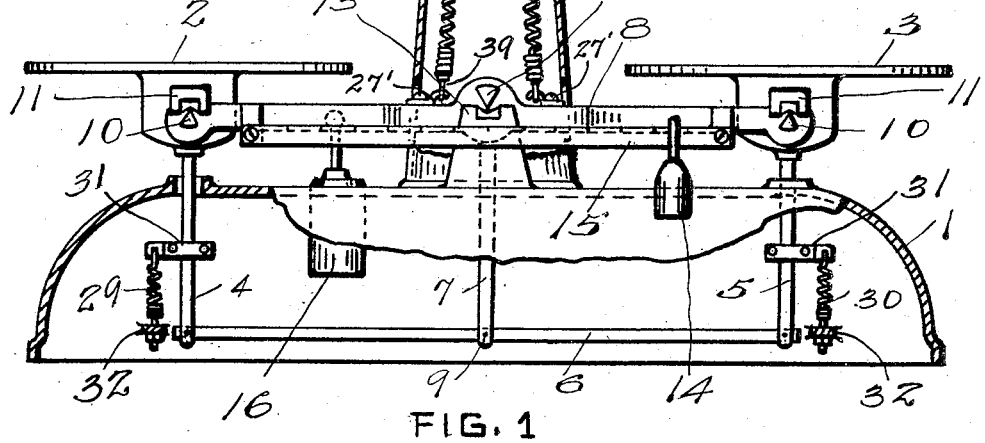
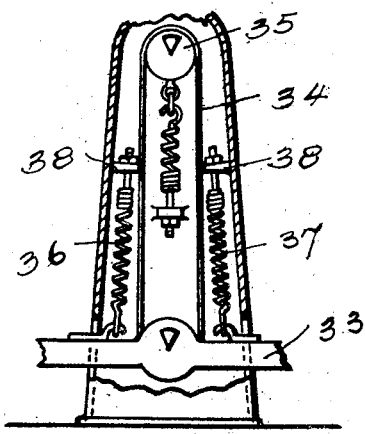
INVENTOR
FRANK S. EWING
Shigley & Harney
ATTORNEYS

UNITED STATES PATENT OFFICE.

FRANK S. EWING, OF COLUMBUS, OHIO.

SCALE.

1,332,116.  Specification of Letters Patent.  Patented Feb. 24, 1920.

Application filed March 24, 1919. Serial No. 284,639.

*To all whom it may concern:*

Be it known that I, FRANK S. EWING, a citizen of the United States of America, residing at Columbus, in the county of Franklin and State of Ohio, have invented certain new and useful Improvements in Scales, of which the following is a specification.

The present invention relates to improvements in scales of the platform type, and applies particularly to spring devices for maintaining an even balance or counterbalance, and, in connection with the pointer or indicator for over or under weight to operate the latter with precision and accuracy.

In actual practice it has been found in numerous instances that the steel bands, which connect the beam with the under weight or overweight pointer, are subject to climatic changes, and these flexible bands now used on many scales on the market soon become crystallized due to the continued bending about the indicator drum, and consequently break with great frequency, causing additional expense in the cost of material and in replacing the broken bands.

To eliminate and modify these and other difficulties, and to enhance the operation of the scales by providing stable but sensitive bearings for all parts of the weighing and indicating devices, in order that a combined spring and even balance scale may be provided, I have designed the improved scale by which difference in weight, whether it be over or under, may quickly be ascertained, when weighing a commodity in one pan or platform against the known weight on the other platform.

In the accompanying drawings one complete example of the physical embodiment of the invention is illustrated, together with a slightly modified form, showing the best modes so far devised for the practical application of the principles of the invention.

Figure 1 is a view in elevation, partly broken away for convenience of illustration, of an "exact-weight" type of platform scales, in which the difference in weight between the commodity and the known weight is indicated, and equipped with the spring devices of my invention.

Fig. 2 is an enlarged view in side elevation of the drum for controlling the exact-weight pointer showing its knife edge bearings and spring connections.

Fig. 3 is an enlarged detail view of the adjustable features of the spring which holds the knife edge bearings of the drum to their bearings.

Fig. 4 is a view illustrating a modified form of the invention involving the use of a band over the drum from the beam and with the springs for the beam attached to the tower instead of to the drum.

In order that the invention may be readily understood and its merits recognized I have depicted a well known type of "exact-weight" platform scales involving the hollow base or casing 1 with its two balanced platforms 2, and 3 whose stems 4 and 5 are connected by the check rod 6 by the usual pivotal joints, and the center post 7 of the beam 8 is also pivoted at 9 to the check rod. The beam has the usual knife edge bearings 10 10 for the bearing lugs 11 11 of the platforms, the lugs being arranged in pairs as usual, and the fulcrum bearing lugs 12 of the beam rest with their knife edges on the supporting blocks 13 of the base. The scales are operated either by placing a commodity on one platform to balance the known weight on the other platform, or the weight 14 may be shifted on the scale bar 15 to counterbalance the weight of the commodity on one of the platforms, a dash-pot 16 being illustrated in connection with the beam for stabilizing the scales under ordinary conditions, but not actually necessary when the scales are equipped with the springs of the present invention.

The exact-weight pointer or needle 16 which operates or oscillates in its casing 17 at the top of the tower 18, superposed on the base 1, and the pointer which co-acts with the "under" and "over" graduations or marks within the casing 17 projects upwardly from its drum 19 supported by its bearing edges 20 20 on the beveled face supports or lugs 21 21 of the casing.

The bearing members 20 of the pointer are held down on their supporting lugs through the instrumentality of the spring 22, attached at 23 to the drum and arranged vertically within the tower between the attaching lug 24 of the tower and the drum. The spring is alined with the pointer, axially of the drum and the bearing members 20 21 and it is under tension to hold the knife edge 20 on its lugs or V-blocks to prevent slipping, vibrations, lost motion or rattling noise of the parts. The tension may be adjusted through the bolt 25 and its screw head 26, the latter being adapted to turn or "screw" into the spring, as best seen in Fig. 3, and by this turning of the head the number of coils of the spring engaged will be decreased or increased with the consequent placing of the spring under greater tension, or lessening of the tension, thus strengthening or weakening the spring as desired. A further, more delicate adjustment, may be accomplished by turning the nut 270 on the threaded end of the bolt, against the washer 280 which lies against the lug 24, and this adjustment is necessary in precisely and accurately adjusting the scales and the pointer and sealing them in proper relationship.

This manner of adjusting the tension of the springs is carried out in all the springs of the scales, there being the two beam springs 27 and 28, and the stem springs 29 and 30, as shown in Fig. 1. The springs, 27 and 28 act as links to connect the pointer drum and the scale beam together, one spring at each side of the beam fulcrum, so that the movement of the beam is transmitted through the springs to the drum and pointer, and as these springs are identical and under the same tension at normal they are adjusted to hold the pointer 16 at the "exact-weight" mark in the center of the "under" and "over" graduations. The two springs 29 and 30 are likewise identical and adjusted to the same tension, they being suspended by clamps 31 from the stems and secured in lugs 32 of the base. The pairs of springs, it will readily be apparent, stabilize the movements of the parts, and as they contract and expand equally in changes of temperature their uniformity of action is not changed, and as they are protected within the casing or housing, are not likely to be broken or disarranged. The springs also are valuable assets in that they hold the bearings in position and steady the parts of the scales while they are being moved or transported, holding the parts from slipping or becoming displaced.

In Fig. 4, the beam 33 has a flexible band 34 passing over the pointer drum 35, and the two springs 36 and 37 are attached, one at each side of the beam fulcrum, between the beam and the lugs 38 in the tower, the bottom springs 29 and 30 being omitted. In this instance the counterbalancing springs for the beam are above the center of gravity, instead of below the center, as in Fig. 1, and the pointer is actuated directly by the flexible band 34 which frictionally engages the drum to oscillate it.

In Fig. 1 the respective springs 27 and 28, are suspended, normally under tension, between the hooks 27' and 27ª, respectively of the beam and drum, and, inasmuch as the adjusting features of all the springs are the same, the description of the device of Fig. 3 will suffice for all springs, except that an eye 39 may be necessary at the lower ends of the springs 27 and 28 for attachment to the hooks 27'.

What I claim is—

1. The combination with the oscillatable beam of a pair of scales, an "exact-weight" pointer and its drum, of a tension spring at each side of the fulcrum of the beam connecting the beam and drum.

2. The combination with the oscillatable beam, an "exact-weight" pointer and its oscillatable drum, of an adjustable tension spring at each side of the fulcrum of the beam connecting the beam and drum.

3. The combination with the oscillatable beam, an "exact-weight" pointer and the drum for the pointer having knife edge supports, of a spring holding said supports in position, and a tension spring at each side of the beam fulcrum connecting the beam with said drum.

4. The combination with the beam, the platforms and their pivoted stems and a check-rod connecting the stems, of a laterally projecting clamp attached to each stem, and springs engaged at one end by said clamps and having their other ends anchored to a stationary part of the scales.

5. The combination with the beam and drum as described, of a tension spring at each side of the beam fulcrum connecting the beam and drum, a bolt for each spring having a spring engaging threaded head for adjusting the tension of the spring, and said bolt engaged with one of the movable members, as described.

In testimony whereof he affixes his signature.

FRANK S. EWING.